(12) United States Patent
Kray et al.

(10) Patent No.: US 11,215,069 B2
(45) Date of Patent: Jan. 4, 2022

(54) SOFTWALL CONTAINMENT SYSTEMS

(71) Applicant: General Electric Company, Schenectady, NY (US)

(72) Inventors: Nicholas Joseph Kray, Mason, OH (US); Thomas Chadwick Waldman, Boston, MA (US); Manoj Kumar Jain, Karnataka (IN); Mojibur Rahman, Mason, OH (US); Nitesh Jain, Karnataka (IN); Nagamohan Govinahalli Prabhakar, Karnataka (IN); Scott Roger Finn, Montgomery, OH (US); Apostolos Pavlos Karafillis, Winchester, MA (US)

(73) Assignee: General Electric Company, Schenectady, NY (US)

( * ) Notice: Subject to any disclaimer, the term of this patent is extended or adjusted under 35 U.S.C. 154(b) by 567 days.

(21) Appl. No.: 15/596,523

(22) Filed: May 16, 2017

(65) Prior Publication Data

US 2018/0334922 A1    Nov. 22, 2018

(51) Int. Cl.
*F01D 21/04* (2006.01)
*F01D 25/24* (2006.01)

(52) U.S. Cl.
CPC .......... *F01D 21/045* (2013.01); *F01D 25/24* (2013.01); *F05D 2220/36* (2013.01); *F05D 2300/501* (2013.01)

(58) Field of Classification Search
CPC ........ F01D 21/04; F01D 21/045; F01D 25/24; F16M 1/00; F16M 1/04; F16M 1/08; F05D 2220/36; F05D 2300/501; F05D 2260/311; F02C 7/04
See application file for complete search history.

(56) References Cited

U.S. PATENT DOCUMENTS

| | | | | |
|---|---|---|---|---|
| 4,534,698 | A | * | 8/1985 | Tomich ................. F01D 21/045 415/121.2 |
| 5,388,959 | A | * | 2/1995 | Forrester ............... F01D 11/122 415/173.4 |

(Continued)

OTHER PUBLICATIONS

S. Bastida, J. I. Eguiazabal, M. Gaztelumendi, J Nazabal; On the thickness dependence of the modulus of elasticity of polymers, Apr. 1998; vol. 17 Iss. 2; Elsevier. (Year: 1998).*

*Primary Examiner* — Gerald L Sung
*Assistant Examiner* — Rodolphe Andre Chabreyrie
(74) *Attorney, Agent, or Firm* — Dority & Manning, P.A.

(57) ABSTRACT

A softwall containment system for a machine includes an inner wall circumscribing a bladed rotatable member of the machine and extending from a forward end to an aft end. The softwall containment system also includes an outer wall circumscribing the inner wall and extending from a forward end to an aft end. The outer wall is spaced radially outwardly from the inner wall. The outer wall extends axially between a first joint coupling the forward end of the inner wall to the forward end of the outer wall and a second joint coupling the aft end of the inner wall to the aft end of the outer wall. The softwall containment system also includes an anti-ballistic material wrap covering the outer wall, the anti-ballistic material wrap including at least one of a first extension extending forward of the first joint and a second extension extending aft of the second joint.

20 Claims, 4 Drawing Sheets

(56) References Cited

U.S. PATENT DOCUMENTS

| | | | |
|---|---|---|---|
| 5,437,538 A * | 8/1995 | Mitchell | F01D 21/045 |
| | | | 415/200 |
| 6,619,913 B2 | 9/2003 | Czachor et al. | |
| 8,202,041 B2 | 6/2012 | Wojtyczka et al. | |
| 8,402,769 B2 | 3/2013 | Maltson | |
| 8,591,172 B2 | 11/2013 | Bottome | |
| 8,757,958 B2 | 6/2014 | Lussier | |
| 2003/0156940 A1 * | 8/2003 | Czachor | F02C 7/045 |
| | | | 415/119 |
| 2004/0146393 A1 * | 7/2004 | Evans | B29C 33/40 |
| | | | 415/9 |
| 2011/0052383 A1 * | 3/2011 | Lussier | F01D 21/045 |
| | | | 415/200 |
| 2011/0287203 A1 * | 11/2011 | Victor | B29C 37/0053 |
| | | | 428/36.9 |
| 2012/0082541 A1 | 4/2012 | Macchia et al. | |
| 2014/0144568 A1 * | 5/2014 | MacAdams | C09J 5/02 |
| | | | 156/62.8 |
| 2014/0286748 A1 | 9/2014 | Costa et al. | |
| 2016/0097299 A1 | 4/2016 | Evans | |

\* cited by examiner

SOFTWALL CONTAINMENT SYSTEMS

BACKGROUND

The field of the disclosure relates generally to bladed rotatable machines and, more particularly, softwall containment systems for bladed rotatable machines.

At least some known bladed rotatable machines, such as turbofans used in air- or land-based turbofan engines, include containment systems configured to manage situations in which blades separate from the machine, known as "blade out" situations. For example, in at least some known containment systems, a soft-material wall ("softwall") is arranged circumferentially about the bladed rotatable machine and is configured to absorb at least some of the kinetic energy of the separated blade. Some containment systems may further include a substantially impregnable material disposed about the softwall, such as an anti-ballistic material, to prevent the separated blade from piercing the softwall. However, the particular geometry and/or location of the anti-ballistic material may enable the anti-ballistic material to flex radially outwards or axially inwards (e.g., shrink) in an undesirable way.

BRIEF DESCRIPTION

In one aspect, a softwall containment system for a machine having a centerline axis is provided. The containment system includes an inner annular wall circumscribing at least a portion of a bladed rotatable member of the machine and extending from an axially forward end of the inner annular wall to an axially aft end of the inner annular wall. The containment system also includes an outer annular wall circumscribing at least a portion of the inner annular wall and extending from an axially forward end of the outer annular wall to an axially aft end of the outer annular wall. The outer annular wall is spaced radially outwardly from the inner annular wall by a predetermined distance. The outer annular wall extends axially between a first joint coupling the axially forward end of the inner annular wall to the axially forward end of the outer annular wall and a second joint coupling the axially aft end of the inner annular wall to the axially aft end of the outer annular wall. The containment system also includes an anti-ballistic material wrap in close contact with and covering at least a portion of the outer annular wall. The anti-ballistic material wrap includes at least one of a first extension extending forward of the first joint and a second extension extending aft of the second joint.

In one aspect of the disclosure, which may include at least a portion of the subject matter of any of the preceding and/or following examples and aspects, the axially forward end of the outer annular wall and the axially aft end of the outer annular wall each include a tapered section including a conical cross-section.

In one aspect of the disclosure, which may include at least a portion of the subject matter of any of the preceding and/or following examples and aspects, at least one of the tapered sections includes a surface treatment that increases a sliding friction along the tapered section.

In one aspect of the disclosure, which may include at least a portion of the subject matter of any of the preceding and/or following examples and aspects, the axially forward end of the outer annular wall and the axially aft end of the outer annular wall each further include a distal section having an approximately cylindrical cross-section.

In one aspect of the disclosure, which may include at least a portion of the subject matter of any of the preceding and/or following examples and aspects, the at least one of the first extension and the second extension covers at least a portion of a corresponding at least one of the distal sections.

In one aspect of the disclosure, which may include at least a portion of the subject matter of any of the preceding and/or following examples and aspects, the at least one of the first extension and the second extension is configured to resist a radially outward movement of the corresponding at least one of the distal sections.

In one aspect of the disclosure, which may include at least a portion of the subject matter of any of the preceding and/or following examples and aspects, at least one of the first extension and the second extension has a predetermined modulus of elasticity in a circumferential direction permitting the at least one of the first extension and the second extension to increase in diameter when a tensile force is applied to the at least one of the first extension and the second extension.

In one aspect of the disclosure, which may include at least a portion of the subject matter of any of the preceding and/or following examples and aspects, each distal section includes one of the first joint and the second joint.

In one aspect of the disclosure, which may include at least a portion of the subject matter of any of the preceding and/or following examples and aspects, the anti-ballistic material wrap includes the first extension and the second extension.

In one aspect of the disclosure, which may include at least a portion of the subject matter of any of the preceding and/or following examples and aspects, the first extension has a thickness and a length that is greater than or equal to the thickness.

In one aspect of the disclosure, which may include at least a portion of the subject matter of any of the preceding and/or following examples and aspects, the second extension has a thickness and a length that is greater than or equal to the thickness.

In another aspect, a turbofan engine is provided. The turbofan engine includes a core turbine engine, a fan powered by a turbine section of the core turbine engine driven by gas generated in the core turbine engine, and a nacelle at least partially surrounding the core turbine engine and the fan. The nacelle includes a softwall containment system including an inner annular wall circumscribing at least a portion of the fan and extending from an axially forward end of the inner annular wall to an axially aft end of the inner annular wall. The softwall containment system also includes an outer annular wall circumscribing at least a portion of the inner annular wall and extending from an axially forward end of the outer annular wall to an axially aft end of the outer annular wall. The outer annular wall is spaced radially outwardly from the inner annular wall by a predetermined distance, and extends axially between a first joint coupling the axially forward end of the inner annular wall to the axially forward end of the outer annular wall and a second joint coupling the axially aft end of the inner annular wall to the axially aft end of the outer annular wall. The softwall containment system also includes an anti-ballistic material wrap in close contact with and covering at least a portion of the outer annular wall. The anti-ballistic material wrap includes at least one of a first extension extending forward of the first joint and a second extension extending aft of the second joint.

In one aspect of the disclosure, which may include at least a portion of the subject matter of any of the preceding and/or following examples and aspects, the axially forward end of the outer annular wall and the axially aft end of the outer annular wall each include a tapered section including a conical cross-section.

In one aspect of the disclosure, which may include at least a portion of the subject matter of any of the preceding and/or following examples and aspects, the axially forward end of the outer annular wall and the axially aft end of the outer annular wall each further include a distal section having an approximately cylindrical cross-section.

In one aspect of the disclosure, which may include at least a portion of the subject matter of any of the preceding and/or following examples and aspects, the at least one of the first extension and the second extension covers at least a portion of a corresponding at least one of the distal sections.

In one aspect of the disclosure, which may include at least a portion of the subject matter of any of the preceding and/or following examples and aspects, the at least one of the first extension and the second extension is configured to resist a radially outward movement of the corresponding at least one of the distal sections.

In one aspect of the disclosure, which may include at least a portion of the subject matter of any of the preceding and/or following examples and aspects, the anti-ballistic material wrap includes the first extension and the second extension.

In a further aspect, a containment system for a softwall device is provided. The containment system includes a containment portion fabricated from a flexible, approximately cylindrical anti-ballistic material extending between a first containment portion end and a second containment portion end, the anti-ballistic material of the containment portion having a first compliance. The containment system also includes a hoop portion formed at each of the first containment portion end and the second containment portion end, the anti-ballistic material of each the hoop portion having a second compliance, the second compliance being less than the first compliance.

In one aspect of the disclosure, which may include at least a portion of the subject matter of any of the preceding and/or following examples and aspects, each the hoop portion has a respective thickness and a respective length that is greater than the respective thickness.

In one aspect of the disclosure, which may include at least a portion of the subject matter of any of the preceding and/or following examples and aspects, the containment system circumscribes at least a portion of the softwall device.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "axial" and "axially" refer to directions and orientations that extend substantially parallel to a centerline axis of a machine or device, such as an engine. Moreover, the terms "radial" and "radially" refer to directions and orientations that extend substantially perpendicular to the centerline axis of machine or device. In addition, as used herein, the terms "circumferential" and "circumferentially" refer to directions and orientations that extend arcuately about the centerline axis of the machine or device.

Embodiments of the containment systems described herein provide a cost-effective method for reducing deflection of machine such as a softwall device, also referred to herein as a "burstable" device. The containment systems described herein include a sleeve or wrap fabricated from an anti-ballistic material, the wrap having a containment portion and axial extensions or "hoop portions," which facilitate inducing hoop tension about the softwall device. This induced hoop tension distributes radial forces about the wrap, thereby reducing radially outward deflection of the containment portion and the softwall device. In one particular embodiment, the containment system is configured to reduce deflection of an anti-ballistic material wrap around an annular wall of a rotatable bladed machine by axially extending the anti-ballistic material wrap. The induced hoop tension distributes a radial impact force, such as the force on a fan casing from a separated blade. Accordingly, the softwall containment system described herein facilitates reducing deflection of the softwall device (e.g., fan casing) in a radial impact event.

Figure 1:
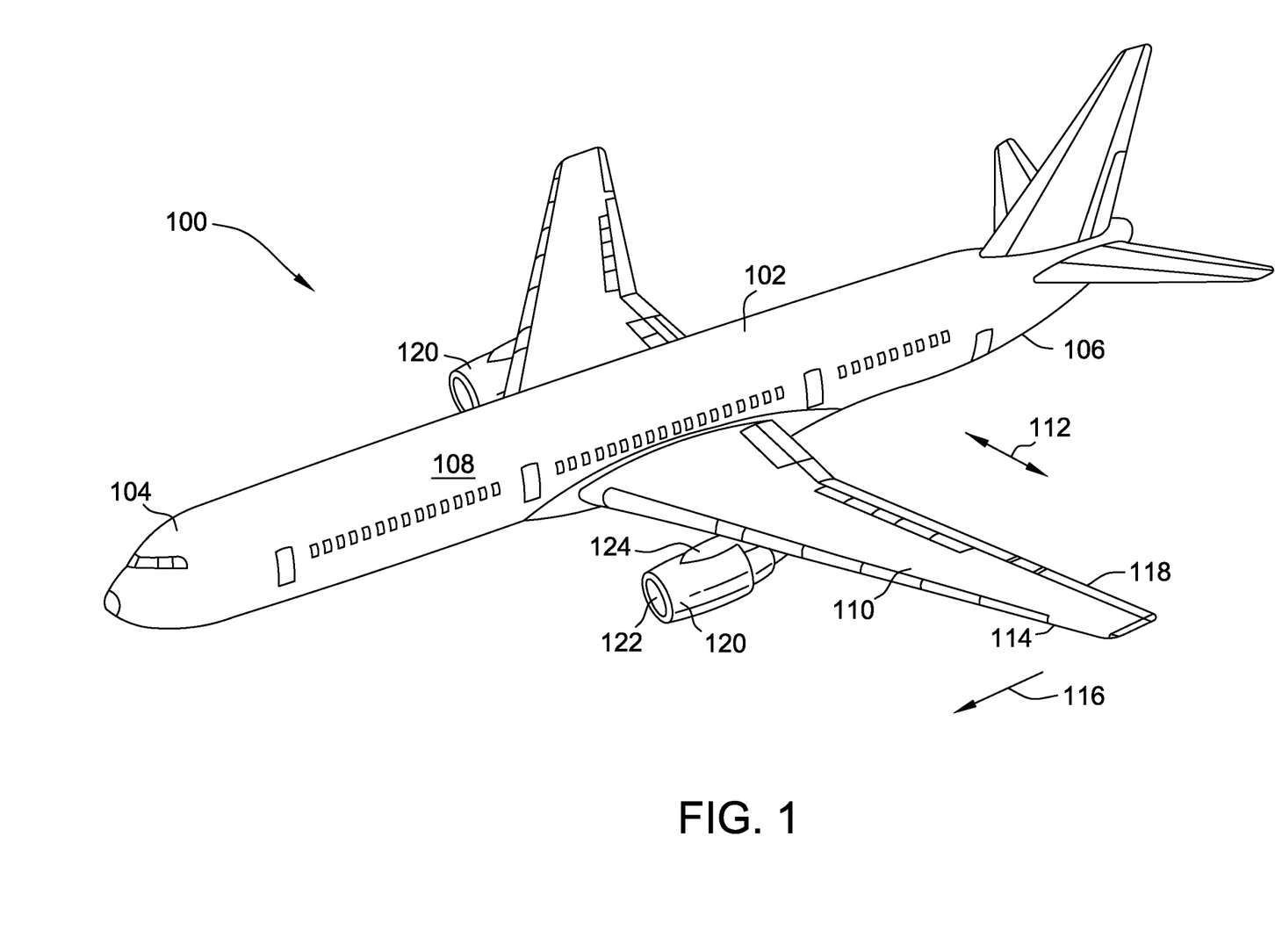
FIG. 1 is an illustration of an exemplary aircraft in accordance with an example embodiment of the present disclosure.

FIG. 1 is a perspective view of an aircraft 100. In the example embodiment, aircraft 100 includes a fuselage 102 that includes a nose 104, a tail 106, and a hollow, elongate body 108 extending therebetween. Aircraft 100 also includes a wing 110 extending away from fuselage 102 in a lateral direction 112. Wing 110 includes a forward leading edge 114 in a direction 116 of motion of aircraft 100 during normal flight and an aft trailing edge 118 on an opposing edge of wing 110. Aircraft 100 further includes at least one engine 120 configured to drive a bladed rotatable member 122 or fan to generate thrust. Engine 120 is connected to an engine pylon 124, which may connect engine 120 to aircraft 100. Engine pylon 124, for example, may couple engine 120 to at least one of wing 110 and fuselage 102, for example, in a pusher configuration (not shown) proximate tail 106.

Figure 2:
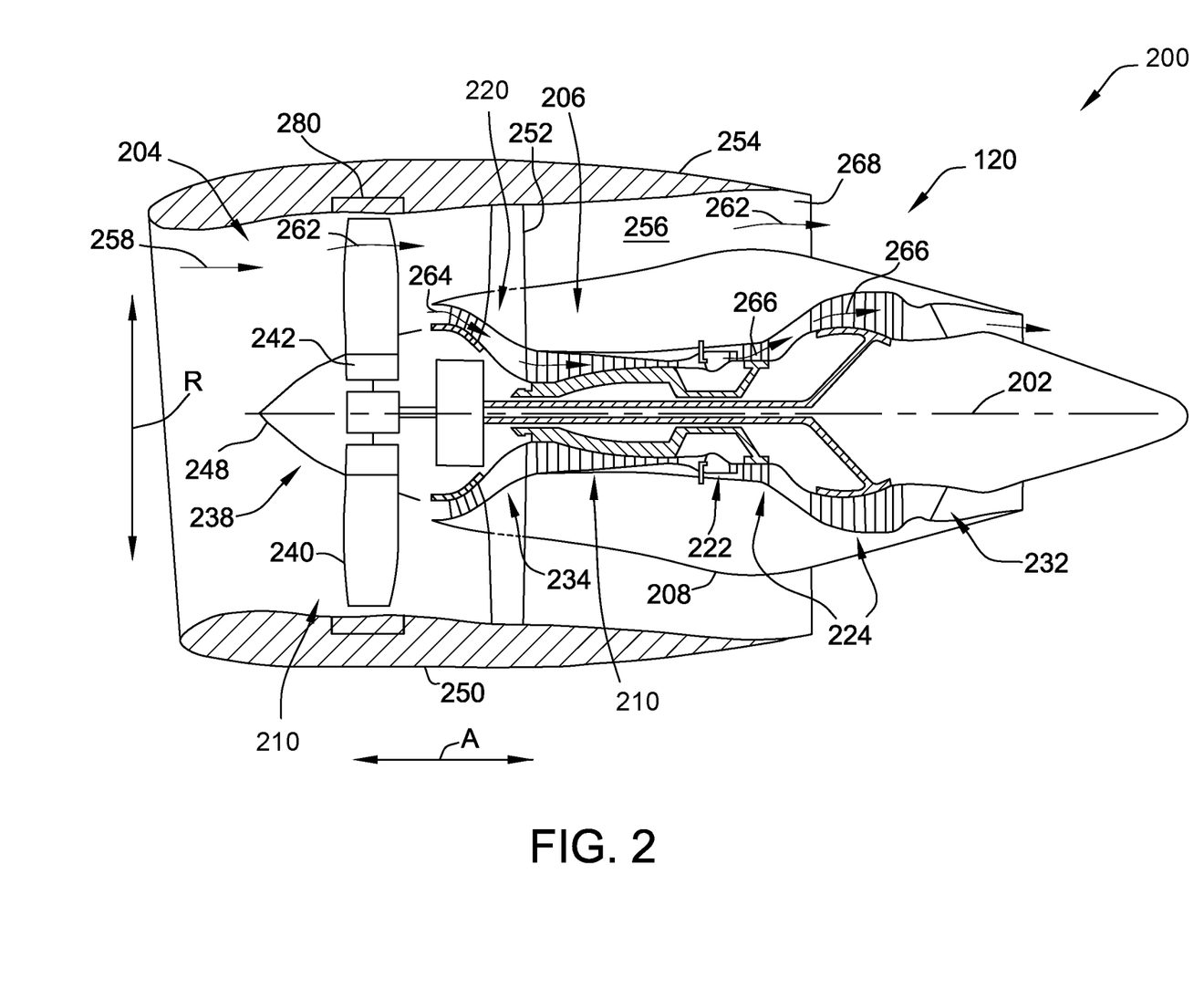
FIG. 2 is a schematic illustration of an exemplary turbofan engine that may be used with the aircraft shown in FIG. 1.

FIG. 2 is a schematic cross-sectional view of a machine 200 in accordance with an exemplary embodiment of the present disclosure. In the illustrated embodiment, machine 200 is embodied as engine 120 (shown in FIG. 1). More specifically, engine 120 is embodied in a high-bypass turbofan jet engine. It should be understood that machine 200 may include any machine and is not limited to aircraft engines. As shown in FIG. 2, engine 120 defines an axial direction A (extending parallel to a longitudinal centerline axis 202 provided for reference) and a radial direction R. In general, engine 120 includes a fan assembly 204 and a core turbine engine 206 disposed downstream from fan assembly 204.

In the example embodiment, core turbine engine 206 includes an approximately tubular engine casing 208 that encases one or more bladed rotatable members 210. More particularly, engine casing 208 encases, in serial flow relationship, a compressor section 220, a combustion section 222, a turbine section 224, and a jet exhaust nozzle section 232. The compressor section 220, combustion section 222, turbine section 224, and jet exhaust nozzle section 232 may each include one or more bladed rotatable members 210, such as turbines or compressors, and together define a core air flowpath 234.

In the example embodiment, fan assembly 204 also includes a bladed rotatable member 210, specifically a fan 238 having a plurality of fan blades 240 coupled to a disk 242 in a spaced apart relationship. Fan blades 240 extend radially outwardly from disk 242. Fan blades 240 and disk 242 are together rotatable about longitudinal centerline axis 202. Disk 242 is covered by a rotatable front hub 248 aerodynamically contoured to promote an airflow through the plurality of fan blades 240.

Additionally, engine 120 may include an annular fan casing or outer nacelle 250 that circumferentially surrounds fan 238 and/or at least a portion of core turbine engine 206. In the example embodiment, nacelle 250 is configured to be supported relative to core turbine engine 206 by a plurality of circumferentially-spaced outlet guide vanes 252. Moreover, a downstream section 254 of nacelle 250 may extend over an outer portion of core turbine engine 206 so as to define a bypass duct 256 therebetween. In the illustrated embodiment, nacelle 250 includes a softwall containment system 280, described further herein, at an axial location corresponding to fan 238. In other words, softwall containment system 280 circumferentially surrounds fan 238.

During operation of engine 120, a volume of air 258 enters engine 120 through nacelle 250 and/or fan assembly 204. As volume of air 258 passes across fan blades 240, a first portion 262 of volume of air 258 is directed or routed into bypass duct 256 and a second portion 264 of volume of air 258 is directed or routed into core air flowpath 234. The pressure of second portion 264 is then increased as it is routed through compressor section 220 and into combustion section 222, where it is mixed with fuel and burned to provide combustion gases 266. Combustion gases 266 are routed through turbine section 224 where a portion of thermal and/or kinetic energy from combustion gases 266 is extracted to power or drive rotation of at least a portion of compressor section 220 and/or of fan 238. Combustion gases 266 are subsequently routed through jet exhaust nozzle section 232 of core turbine engine 206 to provide propulsive thrust. Simultaneously, the pressure of first portion 262 is substantially increased as first portion 262 is routed through bypass duct 256 before it is exhausted from a fan nozzle exhaust section 268 of engine 120, also providing propulsive thrust.

Engine 120 is depicted in the figures by way of example only, in other exemplary embodiments, engine 120 may have any other suitable configuration including for example, a turboprop engine, a military purpose engine, and a marine or land-based aero-derivative engine.

Figure 3:
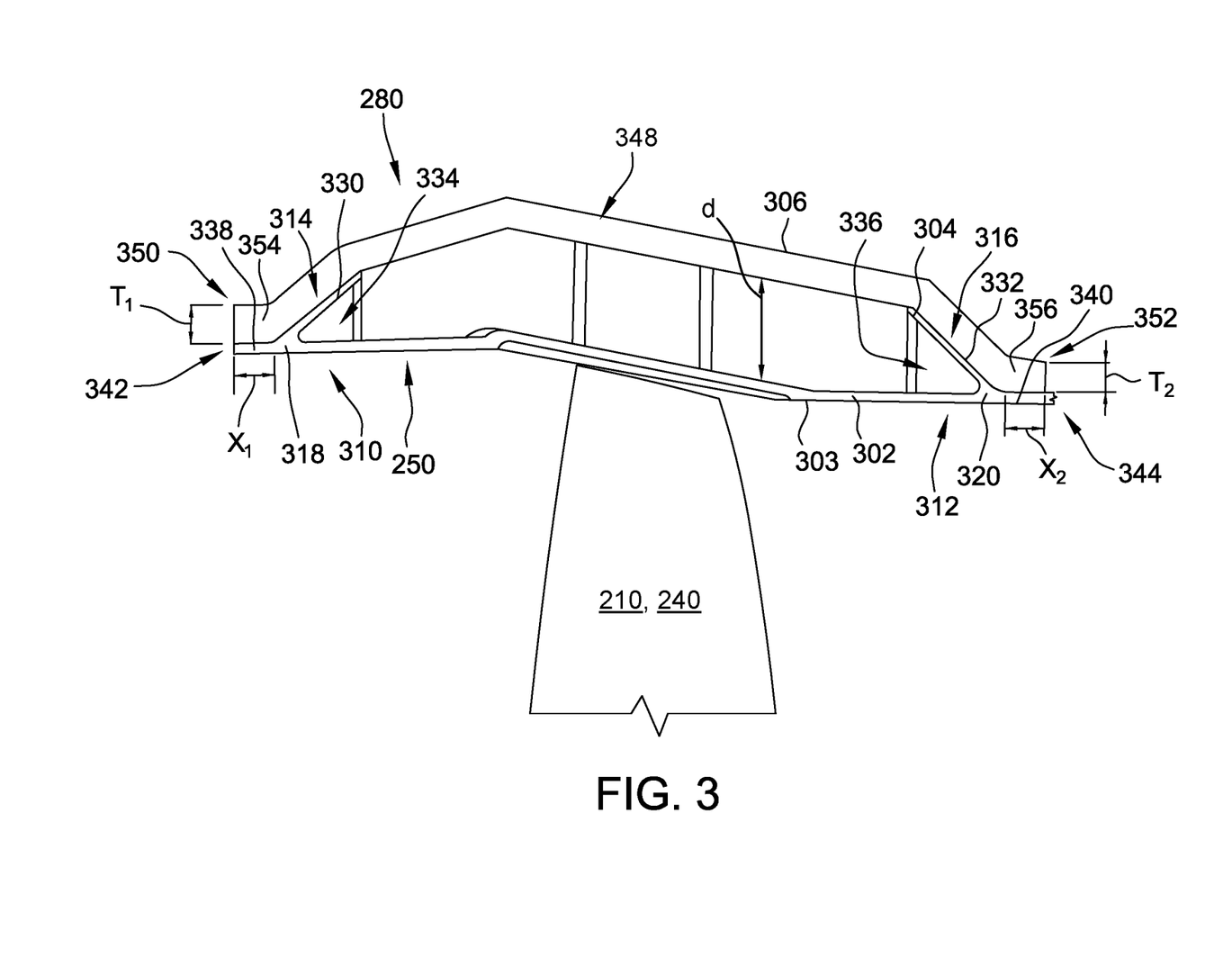
FIG. 3 depicts a cross-sectional view of an exemplary softwall containment system that may be used with the turbofan engine shown in FIG. 2.

FIG. 3 depicts a cross-sectional view of an exemplary embodiment of softwall containment system 280 (shown in FIG. 2) that may be used with machine 200 (also shown in FIG. 2), such as turbofan engine 120 (shown in FIGS. 1 and 2). Although softwall containment system 280 is illustrated as implemented with bladed rotatable member 210 implemented as fan 238 (shown in FIG. 2) of engine 120, it should be readily understood that softwall containment system 280 may be implemented with substantially any bladed rotatable member 210. Moreover, softwall containment system 280 may be implemented with substantially any softwall device, also referred to as a "burstable device," that may be vulnerable to undesirable radial deflection. Softwall containment system 280 includes an inner annular wall 302 as well as an outer annular wall 304 that circumscribes at least a portion of inner annular wall 302. Inner annular wall 302 circumscribes at least a portion of fan 238. Specifically, inner annular wall 302 circumscribes fan blades 240. In the illustrated embodiment, inner annular wall 302 extends from a first or axially forward end 310 to a second or axially aft end 312. In alternative embodiments, inner annular wall 302 may extend between any two points. In the exemplary embodiment, inner annular wall 302 is integral to nacelle 250 and defines at least a portion of an inner surface 303 of nacelle 250.

Outer annular wall 304 is spaced radially from inner annular wall 302. In the illustrated embodiment, outer annular wall 304 extends from a first or axially forward end 314 to a second or axially aft end 316. In alternative embodiments, outer annular wall 304 may extend between any two points. A first joint 318 couples first end 314 to first end 310 of inner annular wall 302, and a second joint 320 couples second end 316 to second end 312 of inner annular wall 302. In one embodiment, outer annular wall 304 is integral to nacelle 250. In such embodiments, first joint 318 is an integral joint where inner annular wall 302 and outer annular wall 304 meet at their first ends 310, 314, and second joint 320 is an integral joint where inner annular wall 302 and outer annular wall 304 meet at their second ends 312, 316. In another embodiment, outer annular wall 304 is separate from and coupled to nacelle 250. In such embodiments, first joint 318 and second joint 320 are each a mechanical joint including one or more of a weld, a fastener, or an adhesive.

Outer annular wall 304 is radially spaced from inner annular wall 302 by a predetermined distance d. In the illustrated embodiment, outer annular wall 304 is generally tapered at first end 314 and second end 316, such that distance d varies axially. More particularly, first end 314 and second end 316 include a first tapered section 330 and a second tapered section 332, respectively, each having a corresponding substantially conical cross-section 334, 336. In such embodiments, tapered sections 330, 332 may be referred to as "angel wings." In addition, in the illustrated embodiment, first tapered section 330 and second tapered section 332 terminate in a first distal section 338 and a second distal section 340, respectively, each having a corresponding approximately cylindrical cross-section 342, 344. In other words, outer annular wall 304 transitions from having a both radial and axial profile at tapered sections 330, 332 (i.e., having conical cross-sections 334, 336) to a substantially purely axial profile at distal sections 338, 340 (i.e., having cylindrical cross-sections 342, 344). First distal section 338 may include first joint 318, and second distal section 340 may include second joint 320.

Softwall containment system 280 further includes an anti-ballistic material wrap 306. Anti-ballistic material wrap 306 is fabricated from an anti-ballistic material, such as, but not limited to, aromatic polyamide, also known as aramid, para-aramid, graphene, polymer matrix composite, ultra-high molecular weight polyethylene (UHMWPE), and/or any other material that is substantially impregnable during a high-speed impact. In one embodiment, anti-ballistic material wrap 306 is fabricated from a single sheet of the anti-ballistic material and is wrapped about nacelle 250 many times, such that anti-ballistic material wrap 306 as illustrated in FIG. 3 includes a plurality of layers or plies. In the illustrated embodiment, anti-ballistic material wrap 306 circumscribes and covers at least a portion of outer annular wall 304. Anti-ballistic material wrap 306 is coupled to and/or in close contact with outer annular wall 304. Anti-ballistic material wrap 306 includes a body or containment portion 348. Anti-ballistic material wrap 306 extends from a first or axially forward end 350, through containment portion 348, to a second or axially aft end 352. In the exemplary embodiment, first end 350 includes a first extension 354 that extends forward of first joint 318. In addition, second end 352 includes a second extension 356 that extends aft of second joint 320. In other words, anti-ballistic material wrap 306 extends from forward of first joint 318 to aft of second joint 320. Although anti-ballistic material wrap 306 is illustrated as including both first extension 354 and second extension 356, in an alternative embodiment, anti-ballistic material wrap 306 includes only first extension 354. In other words, anti-ballistic material wrap 306 extends from first end 350 forward of first joint 318 to second end 352 forward of second joint 320. In another alternative embodiment, anti-ballistic material wrap 306 includes only second extension 356. In other words, anti-ballistic material wrap 306 extends from first end 350 aft of first joint 318 to second end 352 aft of second joint 320.

First extension 354 has a thickness $T_1$ and a length $X_1$. In the illustrated embodiment, length $X_1$ is greater than or equal to thickness $T_1$. First extension 354 covers at least a portion of first distal section 338. Similarly, second extension 356 has a thickness $T_2$ and a length $X_2$. In the illustrated embodiment, length $X_2$ is greater than or equal to thickness $T_2$. Length $X_2$ may be less than, equal to, or greater than length $X_1$. Similarly, thickness $T_2$ may be less than, equal to, or greater than thickness $T_1$. Second extension 356 covers at least a portion of second distal section 340.

Extending anti-ballistic material wrap 306 to include first and/or second extensions 354, 356 facilitates reducing outward deflection of inner annular wall 302 and/or outer annular outer wall 304 in a radial impact event. Specifically, first and/or second extensions 354, 356 facilitate inducing an increased hoop tension on outer annular wall 304 during a radial impact event, thereby facilitating increased counter-active radial force (against an outward radial force, such as the impact force of a separated fan blade 240). Accordingly, first and second extensions 354, 356 may be referred to as "hoop portions." In the exemplary embodiment, first and second extensions 354, 356 are configured to resist a radially outward movement of corresponding tapered sections 330, 332 and/or of distal sections 338, 340.

Although reducing deflection of inner annular wall 302 and/or outer annular outer wall 304 in a radial impact event may be desirable, it may also be desirable to permit a minimum and/or predetermined amount of deflection of inner annular wall 302 and/or outer annular outer wall 304, to accommodate the absorption of kinetic energy of the separated fan blade 240. Accordingly, in the example embodiment, first extension 354 and/or second extension 356 has a predetermined modulus of elasticity permitting first extension 354 and/or second extension 356 to increase in diameter when a radial tensile force is applied to first extension 354 and/or second extension 356, and/or permitting first extension 354 and/or second extension 356 to lengthen when an axial tensile force is applied thereto (e.g., during a radial impact event). As described above, "modulus of elasticity" refers to a measure of stress vs. strain that is inherent to a material. Generally, a material with a higher modulus of elasticity is stiffer than a material with a lower modulus of elasticity. In one embodiment, containment portion 348 has a first modulus of elasticity, and first and second extensions 354, 356 have a second, higher modulus of elasticity. In this embodiment, having a higher modulus of elasticity facilitates first and second extensions 354, 356 inducing a greater hoop tension than containment portion 348 and resisting axial shortening of anti-ballistic material wrap 306, also referring to as "shrinkage." Reducing shrinkage may be desirable to facilitate continued usage of anti-ballistic material wrap 306 after an initial radial impact event.

In some embodiments, at least one of first end 314 and second end 316 of outer annular wall 304 is treated with a surface treatment to increase a sliding friction along corresponding tapered section(s) 330, 332. Accordingly, in such embodiments, first and/or second extension(s) 354, 356 may experience increased frictional resistance to axial shortening or sliding movement along tapered section(s) 330, 332. Additionally or alternatively, one or more fasteners may be used to releasably couple first and/or second extension(s) 354, 356 to tapered section(s) 330, 332.

Figure 4:
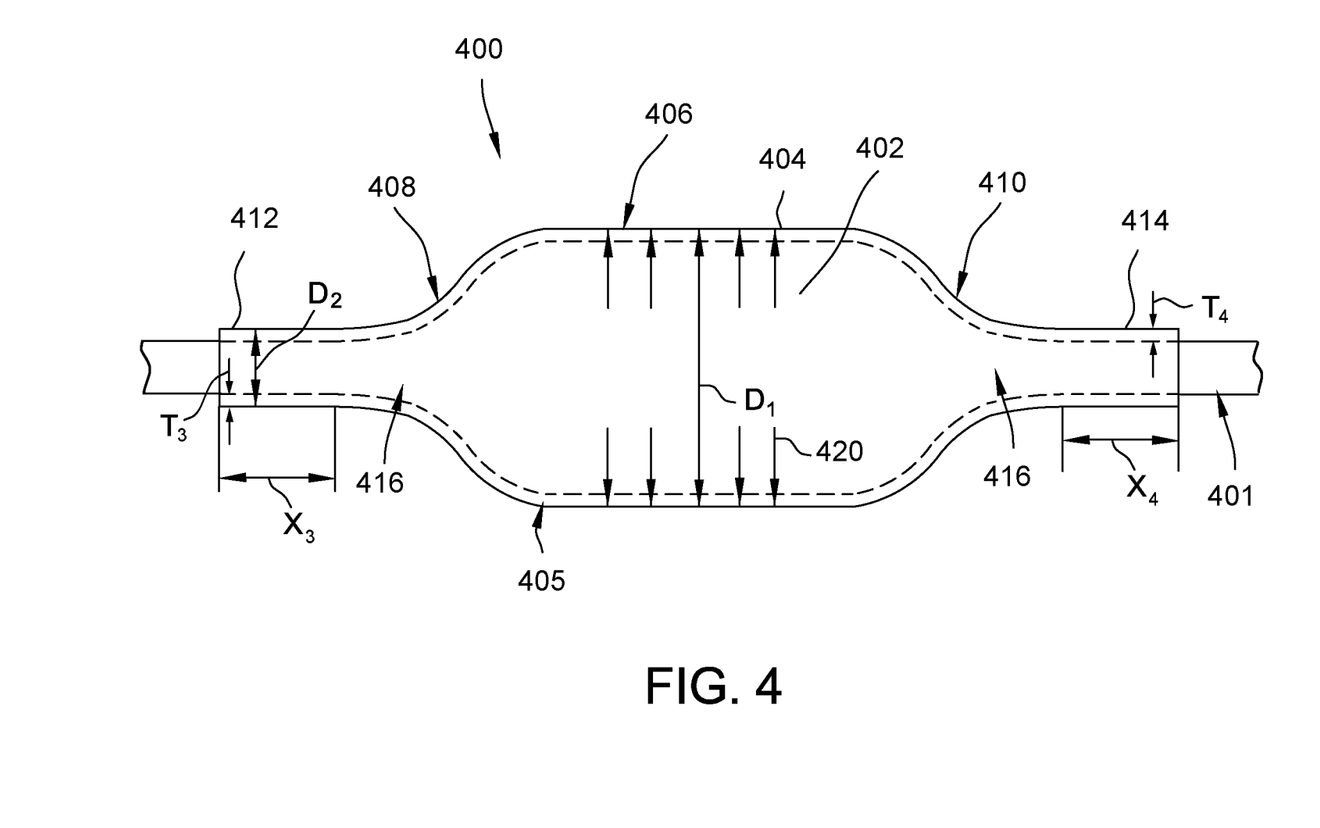
FIG. 4 depicts a cross-sectional view of an exemplary containment system that may be used with any burstable device.

FIG. 4 depicts a cross-sectional view of a containment system 400 for any machine 401 including a softwall device 402. In other words, containment system 400 is not limited to use with aircraft 100 and/or engine 120 (both shown in FIG. 1). In the illustrated embodiment, although softwall device 402 may include one or more components of engine 120, such as fan casing or nacelle 250 (shown in FIG. 2), softwall device 402 may alternatively include any softwall device, such as a casing for any rotatable machine, or any casing that may experience a radial outward force, such as a hose or a combustor casing.

In the example embodiment, softwall device 402 may be substantially cylindrical and/or may have locations along an axial length of softwall device 402 that have varying diameters. Containment system 400 includes a sleeve 404, which may also be referred to as a "wrap," that circumscribes softwall device 402. Sleeve 404 may also be substantially cylindrical and/or may have locations along an axial length of sleeve 404 that have varying diameters. Sleeve 404 is coupled to and/or in close contact with softwall device 402. In the illustrated embodiment, sleeve 404 is configured to substantially correspond in profile (e.g., diameter) to softwall device 402. Sleeve 404 is fabricated from an anti-ballistic material 405, such as, but not limited to, aromatic polyamide, also known as aramid, para-aramid, graphene, polymer matrix composite, ultra-high molecular weight polyethylene (UHMWPE), and/or any other material 405 that is flexible yet substantially resistant to impact.

Sleeve 404 includes a body or containment portion 406, which has a first end 408 and a second end 410. In the exemplary embodiment, a first extension or hoop portion 412 extends from containment portion first end 408, and a second extension or hoop portion 414 extends from containment portion second end 410. Sleeve 404 may include a transition portion 416 between each containment portion end 408, 410 and the respective hoop portion 412, 414. Although sleeve 404 is illustrated as including both first hoop portion 412 and second hoop portion 414, in an alternative embodiment, sleeve 404 includes only first hoop portion 412 or only second hoop portion 414.

In one embodiment, containment portion 406 has a first compliance, and first and second hoop portions 412, 414 have a second, lower compliance. "Compliance," as used herein, refers to a measure of stretchability or flexibility that a material has. Generally, a material with a higher compliance is more stretchable. As described above, "modulus of elasticity" refers to a measure of stress vs. strain that is inherent to a material. Accordingly, in at least some embodiments, first and second hoop portions 412, 414 have a higher modulus of elasticity than containment portion 406. "Elongation to failure" refers to a material's inherent ability to stretch or elongate before failing. Accordingly, in at least some embodiments, first and second hoop portions 412, 414 have a lower elongation to failure than containment portion 406. In the example embodiment, the particular characteristics of first and second hoop portions 412, 414 and containment portion 406 are such that sleeve 404 may experience high local stretching, radially outward at containment portion 406, but low global stretching, axially or radially at first and second hoop portions 412, 414.

In the illustrated embodiment shown in FIG. 4, softwall device 402 is experiencing an outward radial force 420, causing softwall device 402 to expand or bulge. As containment portion 406 has a greater compliance, containment portion 406 has expanded to an expanded diameter $D_1$. In this embodiment, having a lower compliance facilitates first and second hoop portions 412, 414 inducing a greater hoop tension about softwall device 402 than containment portion 406, facilitating increased counter-active radial force against outward radial force 420 and resisting axial shortening of sleeve 404. Accordingly, in the illustrated embodiment, first and second hoop portions 412, 414 have maintained an original or non-expanded diameter $D_2$, to facilitate reducing overall deflection of softwall device 402. In some embodiments, transition portions 416 may have a third compliance between the first and second compliances, facilitating a more gradual transition between containment portion 406 and hoop portions 412, 414 when containment portion 406 expands.

First hoop portion 412 has a thickness $T_3$ and a length $X_3$. In the illustrated embodiment, length $X_3$ is greater than or equal to thickness $T_3$. Similarly, second hoop portion 414 has a thickness $T_4$ and a length $X_4$. In the illustrated embodiment, length $X_4$ is greater than or equal to thickness $T_4$. Length $X_4$ may be less than, equal to, or greater than length $X_3$. Similarly, thickness $T_4$ may be less than, equal to, or greater than thickness $T_3$.

The above-described softwall containment systems provide an efficient method for reducing deflection of a softwall device, such as an annular casing, experiencing an outward radial force, such as during a radial impact event. Specifically, the softwall containment system includes an anti-ballistic wrap about a cylindrical or annular softwall device, and the wrap includes one or more axial extensions or hoop portions. The one or more axial extensions facilitate increasing a hoop tension or hoop stress about the annular casing to provide additional counter-active force against the outward radial force. In addition, the one or more axial extensions facilitate resisting an axial shortening of the anti-ballistic wrap. In some cases, providing the axial extensions may increase a weight and/or a cost of an anti-ballistic wrap over alternative wraps without such extensions. However, by improving the shock absorption characteristics of the anti-ballistic wrap (i.e., reducing radial deflection and/or axial shortening), there may be opportunities to reduce material and/or weight in other locations of the softwall device. For instance, as the anti-ballistic wrap including one or more axial extensions may provide sufficient anti-ballistic/shock-absorption characteristics, material radially outward of a bladed rotatable member may be reduced to a level that may have been previously undesirable.

Exemplary embodiments of softwall containment systems are described above in detail. The softwall containment systems, and methods of making and using such systems and component devices, are not limited to the specific embodiments described herein, but rather, components of the systems and/or steps of the methods may be utilized independently and separately from other components and/or steps described herein. For example, the softwall containment system may also be used in any rotatable machine having a rotatable bladed member surrounded by an annular softwall.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A softwall containment system for a gas turbine engine having a centerline axis, said containment system comprising:
    an inner annular wall circumscribing at least a portion of a bladed rotatable member of the gas turbine engine and extending from an axially forward end of said inner annular wall to an axially aft end of said inner annular wall;
    an outer annular wall circumscribing at least a portion of said inner annular wall and extending from an axially forward end of said outer annular wall to an axially aft end of said outer annular wall, said outer annular wall spaced radially outwardly from said inner annular wall by a predetermined distance, said outer annular wall extending axially between a first joint coupling said axially forward end of said inner annular wall to said axially forward end of said outer annular wall, the first joint being axially forward of the axially forward end of the inner annular wall, and a second joint coupling said axially aft end of said inner annular wall to said axially aft end of said outer annular wall, the second joint being axially aft of the axially aft end of the inner annular wall, wherein said inner annular wall and said outer annular wall are spaced apart between an entire axial length from said first joint to said second joint; and an anti-ballistic material wrap in contact with and covering at least a portion of said outer annular wall, said anti-ballistic material wrap comprising a body portion and at least one of a first extension extending forward of said first joint and a second extension extending aft of said second joint, wherein said anti-ballistic material wrap is made of elastic materials, and the body portion has a first modulus of elasticity in a circumferential direction, the at least one of said first extension and said second extension has a second modulus of elasticity in the circumferential direction, and the second modulus of elasticity is less than the first modulus of elasticity.

2. The softwall containment system of claim 1, wherein said axially forward end of said outer annular wall and said axially aft end of said outer annular wall each comprise a tapered section comprising a conical shape.

3. The softwall containment system of claim 2, wherein said axially forward end of said outer annular wall and said axially aft end of said outer annular wall each further comprise a distal section having an approximately cylindrical shape.

4. The softwall containment system of claim 3, wherein said at least one of said first extension and said second extension covers at least a portion of a corresponding at least one of said distal sections.

5. The softwall containment system of claim 4, wherein said at least one of said first extension and said second extension is configured to resist a radially outward movement of said corresponding at least one of said distal sections.

6. The softwall containment system of claim 3, wherein the second modulus of elasticity permits said at least one of said first extension and said second extension to increase in diameter when a tensile force is applied to said at least one of said first extension and said second extension.

7. The softwall containment system of claim 3, wherein each distal section comprises one of said first joint and said second joint.

8. The softwall containment system of claim 1, wherein said anti-ballistic material wrap comprises said first extension and said second extension.

9. The softwall containment system of claim 1, wherein said first extension has a thickness and a length that is greater than or equal to the thickness.

10. The softwall containment system of claim 1, wherein said second extension has a thickness and a length that is greater than or equal to the thickness.

11. A turbofan engine comprising:
a core turbine engine;
a fan powered by a turbine section of said core turbine engine driven by gas generated in said core turbine engine; and
a nacelle at least partially surrounding said core turbine engine and said fan, said nacelle comprising a softwall containment system comprising:

an inner annular wall circumscribing at least a portion of said fan and extending from an axially forward end of said inner annular wall to an axially aft end of said inner annular wall;

an outer annular wall circumscribing at least a portion of said inner annular wall and extending from an axially forward end of said outer annular wall to an axially aft end of said outer annular wall, said outer annular wall spaced radially outwardly from said inner annular wall by a predetermined distance, said outer annular wall extending axially between a first joint coupling said axially forward end of said inner annular wall to said axially forward end of said outer annular wall, the first joint being axially forward of the axially forward end of the inner annular wall, and a second joint coupling said axially aft end of said inner annular wall to said axially aft end of said outer annular wall, the second joint being axially aft of the axially aft end of the inner annular wall, wherein said inner annular wall and said outer annular wall are spaced apart between an entire axial length from said first joint to said second joint; and an anti-ballistic material wrap in contact with and covering at least a portion of said outer annular wall, said anti-ballistic material wrap comprising at least one of a first extension extending forward of said first joint and a second extension extending aft of said second joint, wherein said anti-ballistic material wrap is made of elastic materials, and the body portion has a first modulus of elasticity in a circumferential direction, the at least one of said first extension and said second extension has a second modulus of elasticity in the circumferential direction, and the second modulus of elasticity is less than the first modulus of elasticity.

12. The turbofan engine of claim 11, wherein said axially forward end of said outer annular wall and said axially aft end of said outer annular wall each comprise a tapered section comprising a conical shape.

13. The turbofan engine of claim 12, wherein said axially forward end of said outer annular wall and said axially aft end of said outer annular wall each further comprise a distal section having an approximately cylindrical shape.

14. The turbofan engine of claim 13, wherein said at least one of said first extension and said second extension covers at least a portion of a corresponding at least one of said distal sections.

15. The turbofan engine of claim 14, wherein said at least one of said first extension and said second extension is configured to resist a radially outward movement of said corresponding at least one of said distal sections.

16. The turbofan engine of claim 11, wherein said anti-ballistic material wrap comprises said first extension and said second extension.

17. The turbofan engine of claim 11, wherein the second modulus of elasticity permits said at least one of said first extension and said second extension to increase in diameter when a tensile force is applied to said at least one of said first extension and said second extension.

18. The turbofan engine of claim 13, wherein each distal section comprises one of said first joint and said second joint.

19. The turbofan engine of claim 11, wherein said first extension has a thickness and a length that is greater than or equal to the thickness.

20. The turbofan engine of claim 11, wherein said second extension has a thickness and a length that is greater than or equal to the thickness.

\* \* \* \* \*